(12) United States Patent
Takekawa et al.

(10) Patent No.: US 9,021,351 B2
(45) Date of Patent: Apr. 28, 2015

(54) METHOD AND APPARATUS FOR SETTING OUTPUT IMAGE INCLUDING IMAGE PROCESSING INFORMATION AND PROGRAM FOR CONTROLLING THE SAME

(75) Inventors: Nao Takekawa, Tokyo (JP); Kazuto Yamafuji, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 892 days.

(21) Appl. No.: 12/337,152

(22) Filed: Dec. 17, 2008

(65) Prior Publication Data
US 2009/0164894 A1    Jun. 25, 2009

(30) Foreign Application Priority Data
Dec. 20, 2007    (JP) .................. 2007-328262

(51) Int. Cl.
*G06F 17/00*    (2006.01)
*H04N 1/00*    (2006.01)
*G06F 3/0484*    (2013.01)
*H04N 1/23*    (2006.01)
*G06F 17/21*    (2006.01)
*G06F 3/0488*    (2013.01)
*G06F 1/16*    (2006.01)

(52) U.S. Cl.
CPC .......... *H04N 1/00408* (2013.01); *G06F 17/212* (2013.01); *G06F 3/0488* (2013.01); *G06F 1/169* (2013.01); *G06F 3/04845* (2013.01); *G06F 3/04883* (2013.01); *H04N 1/00411* (2013.01); *H04N 1/00413* (2013.01); *H04N 1/00424* (2013.01); *H04N 1/0044* (2013.01); *H04N 1/00466* (2013.01); *H04N 1/00639* (2013.01); *H04N 1/2338* (2013.01); *H04N 2201/0094* (2013.01)

(58) Field of Classification Search
CPC ...... G06F 17/212; G06F 3/0488; G06F 1/169
USPC .................. 715/764, 252–255, 273–275, 762, 715/815–858, 763, 862, 771, 773, 860; 358/1.15; 706/20; 345/1.15, 173
See application file for complete search history.

(56) References Cited

U.S. PATENT DOCUMENTS

2005/0278636 A1*  12/2005  Nomoto ......................... 715/724
2006/0279780 A1*  12/2006  Anno et al. .................... 358/1.15
2007/0091390 A1*  4/2007  Kimura et al. ................. 358/500

(Continued)

FOREIGN PATENT DOCUMENTS

JP    11215283    8/1999
JP    2000094789    4/2000

(Continued)

*Primary Examiner* — Quoc A Tran
(74) *Attorney, Agent, or Firm* — Joscelyn Cockburn

(57) ABSTRACT

Apparatus, method and program product set output characteristics of at least one device of a multifunction image processing system by displaying an initial output image for setting the output image on the display screen; displaying an output setting menu 230 related to a position on the output image according to an operator's indication input made at the position; updating the output image according to operator's setting operations on the setting menu; and displaying the updated output image as the final output image upon completing the setting. The setting menu is displayed in response to the operator's indication input made at the position on the output image and the setting operation input to the position by the operator.

12 Claims, 17 Drawing Sheets

(56) References Cited

U.S. PATENT DOCUMENTS

| | | | |
|---|---|---|---|
| 2007/0226656 A1* | 9/2007 | Zwart | 715/856 |
| 2008/0117463 A1* | 5/2008 | Ohkubo et al. | 358/1.18 |
| 2008/0131181 A1* | 6/2008 | Saitoh et al. | 400/76 |
| 2008/0134027 A1* | 6/2008 | Saeki et al. | 715/274 |
| 2008/0150908 A1* | 6/2008 | Someno | 345/173 |
| 2009/0128504 A1* | 5/2009 | Smith | 345/173 |
| 2011/0018899 A1* | 1/2011 | Benson et al. | 345/619 |

FOREIGN PATENT DOCUMENTS

| | | |
|---|---|---|
| JP | 200127885356 | 10/2001 |
| JP | 2004070114 | 3/2004 |
| JP | 2006024144 | 1/2006 |
| JP | 2006067235 | 3/2006 |
| JP | 2006227740 | 8/2006 |
| JP | 2006-67235 A | 9/2006 |
| JP | 2007280369 | 10/2007 |
| JP | 2007-87166 A | 12/2008 |

* cited by examiner

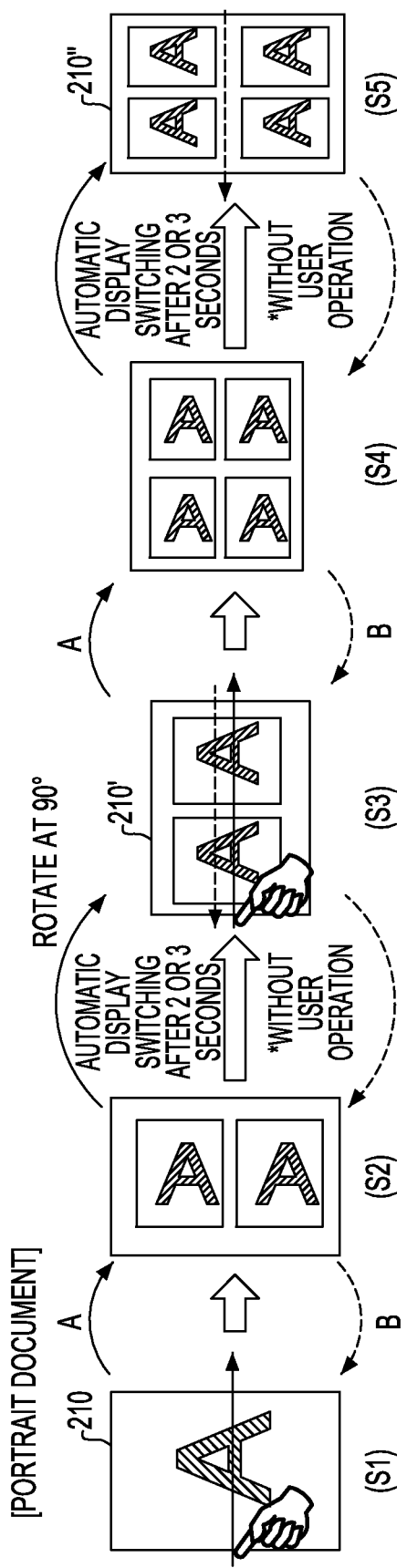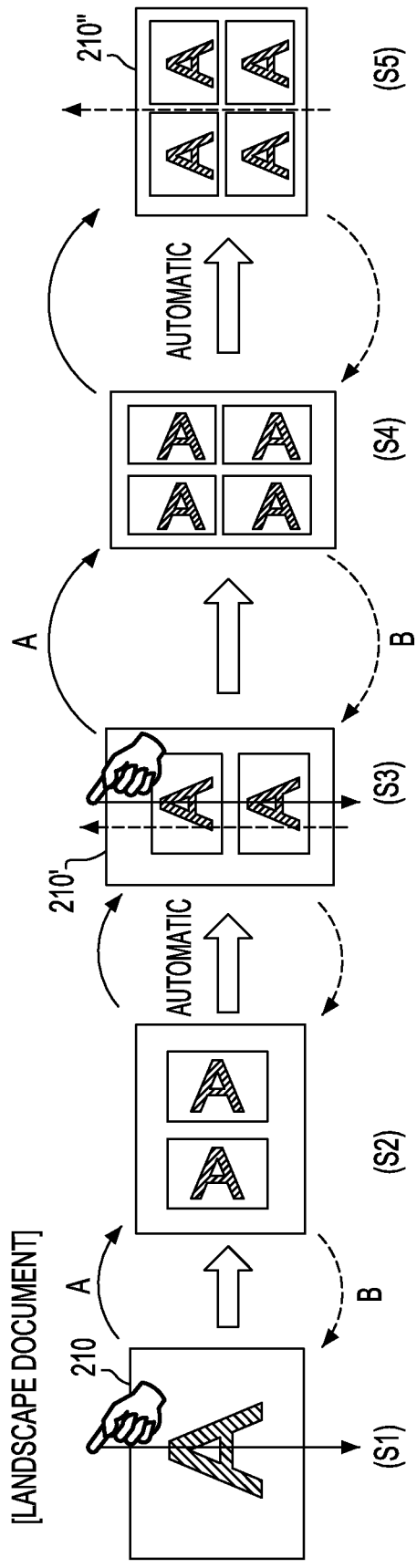

| SET ITEM | | POSITION | SETTING OPERATION (ACTION) | OPERATING ICON | CONFIRMATION DISPLAY ICON (BEFORE CONFIRMATION) |
|---|---|---|---|---|---|
| DARKNESS | | a: ABOVE IMAGE ICON | PRESS FOR A LONG TIME | — | |
| COLOR | | a: ABOVE IMAGE ICON | MOVE FINGER FROM SIDE TO SIDE | — | |
| IMAGE QUALITY | | a: ABOVE IMAGE ICON | MOVE FINGER UP AND DOWN | — | |
| ENLARGEMENT/REDUCTION | | c: UPPER RIGHT END | DRAW | ↗ | DISPLAY CANDIDATE SIZE (FRAME) |
| MARGIN | | d: MARGIN LINE | MOVE, SLIDE | — | |
| DOUBLE SIDE | RIGHT BINDING | e-1: LOWER LEFT END | SLIDE RIGHTWARD | ↻ | |
| | LEFT BINDING | e-2: LOWER RIGHT END | SLIDE LEFTWARD | ↺ | |
| | TOP BINDING | e-3: LOWER LEFT END | SLIDE UPWARD | ↻↺ | |
| | | e-4: LOWER RIGHT END | | | |
| N IN 1 | | f: CENTER OF OUTPUT IMAGE | CUT ACROSS OUTPUT IMAGE | — | |
| DOCUMENT ORIENTATION | PORTRAIT→LANDSCAPE | b-1: UPPER END | SLIDE TO TURN | ↰ | DISPLAY TURNED OUTPUT IMAGE |
| | LANDSCAPE→PORTRAIT | b-2: RIGHT END | | ↱ | |
| STAPLING | ONE POINT, UPPER LEFT | g-1: UPPER LEFT END | DRAW SHORT LINE | — | |
| | ONE POINT, UPPER RIGHT | g-2: UPPER RIGHT END | | | |
| | TWO POINTS, TOP | g-3: UPPER END | | | |
| | TWO POINTS, LEFT | g-4: LEFT END | | | |
| | TWO POINTS, RIGHT | g-5: RIGHT END | | | |
| PUNCHING | TWO HOLES, TOP | h-1: UPPER END | - TAP TWICE<br>- TAP EACH POSITION | — | |
| | TWO HOLES, LEFT | h-2: LEFT END | | | |
| | TWO HOLES, RIGHT | h-3: RIGHT END | | | |
| | THREE HOLES, LEFT | h-2: LEFT END | - TAP THREE TIMES<br>- TAP EACH POSITION | — | |
| | THREE HOLES, RIGHT | h-3: RIGHT END | | | |
| RESET | | THE WHOLE OUTPUT IMAGE | CROSS THE WHOLE OUTPUT IMAGE | — | |

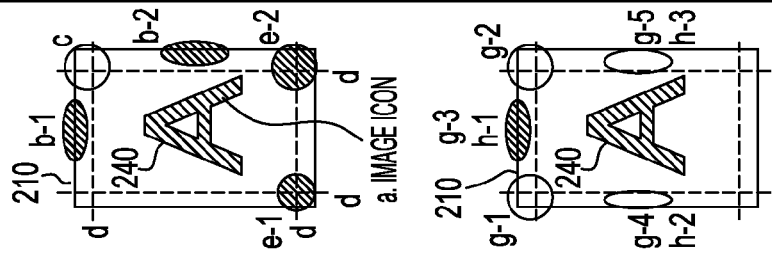

FIG. 15

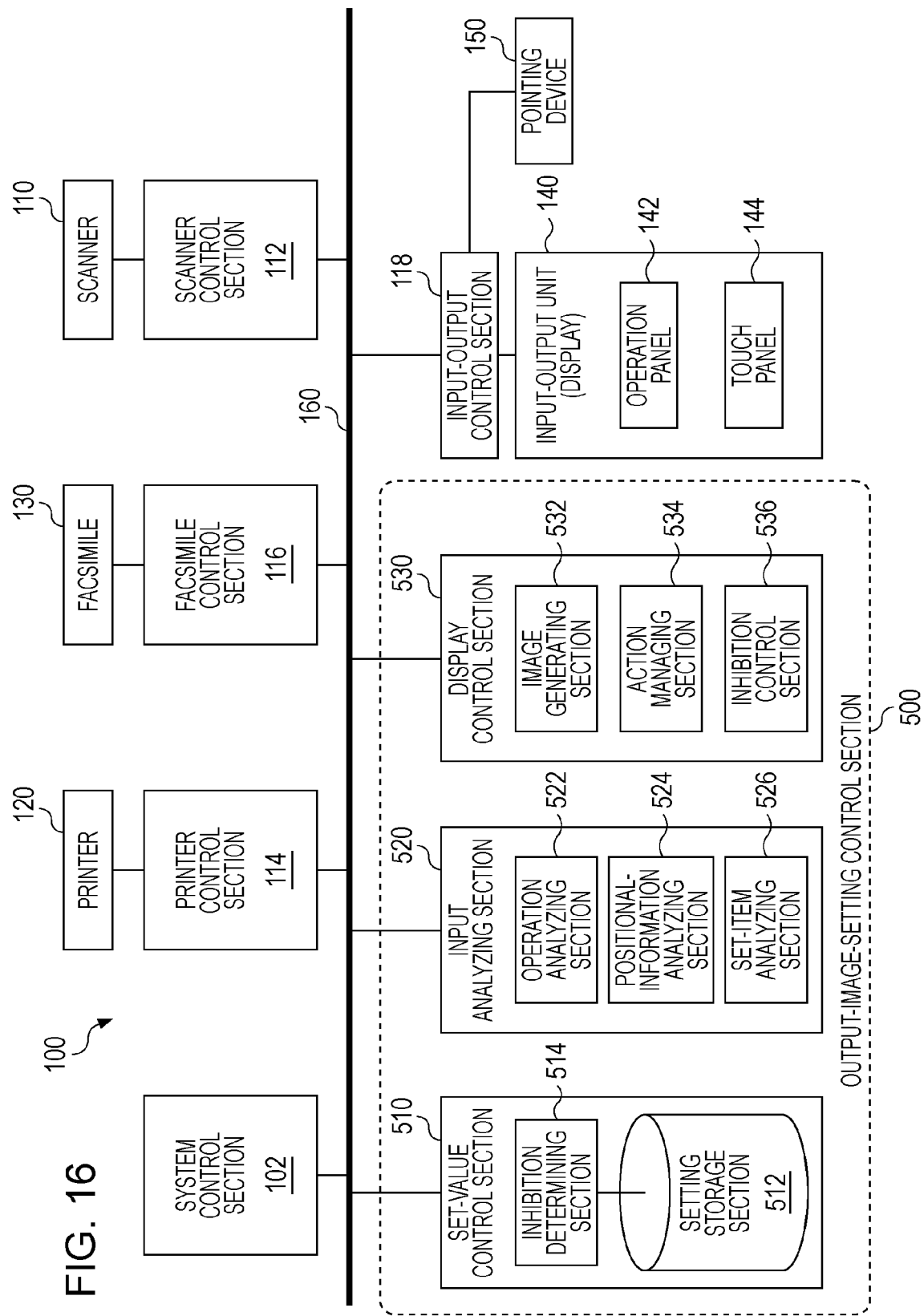

METHOD AND APPARATUS FOR SETTING OUTPUT IMAGE INCLUDING IMAGE PROCESSING INFORMATION AND PROGRAM FOR CONTROLLING THE SAME

RELATED APPLICATION

This application claims priority under 35 U.S.C. §119 to Japanese Patent Application No. 2007-328262 filed Dec. 20, 2007, the entire text of which is specifically incorporated by reference herein.

TECHNICAL FIELD

The present invention relates to a method for setting the output of image processing units such as printers, scanners, facsimile machines, and copying machines. More specifically, the invention relates to a method for directly setting various functions on an output image including image processing information on a display screen and a program for controlling the setting.

BACKGROUND OF THE INVENTION

Multifunction peripherals (MFPs), or digital complex machines (referred to as digital MFPs hereinafter), have recently come into widespread use, which have advanced multifunctionality including a scanner function for reading documents, a copying function for copying documents, a printing function, having a communication facility, for printing external image data, and a facsimile function.

Such digital MFPs require settings on great many functions on their operating screens, including settings on image quality, like monochrome, gray level (darkness or tint), color, and resolution of documents, settings on document pages, like enlargement/reduction ratio, margin, and portrait/landscape (printing direction), and settings on print finishing, like single-sided/double-sided printing, stapling, punching, and N-in-1 (integration function). The user has to open such various setting display screens one by one to determine which function is to be selected for use and to consider how to set the selected function. In other words, the user must repeat the operation of opening individual menu screens for settings, and after the settings, closing the menu, and then opening another menu. This takes great much time.

A recent method for displaying many functions on a small operating screen includes making good use of the operation screen using tabs. However, this method tends to increase the number of user operations, making it difficult to determine where necessary functions are present and what function is to be used, and thus provides low usability.

Therefore, when setting image processing information in the present circumstances, the user must find a desired function from many menu items while considering finished quality, and input correct settings on the respective setting menus. For finished screens, "a preview screen" is present, which, however, is used only for confirmation after various functions have been set on their respective setting menus.

If a desired finishing setting cannot be made, the user must repeat the operation of returning to a mistakenly set menu screen to reset it and reconfirming the setting on a preview screen or cancelling the mistakenly set menu again and again, thus resulting in a very inefficient setting operation.

Japanese Unexamined Patent Application Publication No. 2007-87166 describes a method of displaying an output-image quality icon (associated with a print-setting condition item pointed by a pointer) set in an icon display area on a print setting screen before an input value is determined. The output-image quality icon is displayed in a screen area different from that of the setting item.

Japanese Unexamined Patent Application Publication No. 2006-67235 describes a method of displaying a finished screen on a display panel, obtaining positional information in response to a touch-panel input, displaying a character menu including available process items with reference to a correlation table obtained from the positional information, and setting the process items.

As described above, for setting the output of image information, methods of displaying a set menu and selecting a setting item on the set menu have been employed. In those cases, the user must repeat displaying and selecting the setting process items in deeper levels. Moreover, the user may not be able to understand the function of the setting items because the setting menu is expressed in characters and must repeat trial and error. That is to say, there is no direct connection between a user's desired final setting and an actual operation in the course of actual output settings; in other words, it is not intuitive visual operation, which makes the setting operation extremely difficult. Particularly, recent digital MFPs pose significant problems of complicated operation screens and difficult setting operations for setting the output of image processing information.

Japanese Unexamined Patent Application Publication No. 2007-87166 Japanese Unexamined Patent Application Publication No. 2006-67235

SUMMARY OF THE INVENTION

Accordingly, an object of the present invention is to provide a method for setting the output of various functions of a multifunctional image processing system with ease of operation and intuitive to use without the need for setting operation in deep levels.

Another object of the invention is to provide a program for achieving a method for setting an output image by providing a display screen that allows setting operations on an output image related to an actual output image to confirm the output.

To confirm output setting items for image processing, the invention takes an output image displayed on a display screen as the object of the settings. That is to say, for settings closer to operator's thought process, the invention performs setting operations directly on a graphic output image. According to the invention, in operator's setting operations of various functions, an output setting menu represented by linear and graphical charts is displayed in response to a position on the display screen corresponding to an actual setting operation and a setting operation related to this positional information. Next, the output image is updated to a setting menu for various functions to set the final output image. Alternatively, output settings can be made by directly updating the output image without displaying the setting menu.

To achieve the above objects, a method for setting output settings using an output image displayed on a display screen according to the invention includes the steps of: displaying an initial output image for setting output image settings on the display screen; switching to a mode of inputting the output image settings according to an operator's indication input made at a predetermined position on the output image; updating the output image according to an operator's setting operation following the indication input by the operator; and displaying the updated output image as the final output image when the setting operation is stopped by the operator and completing the setting of the output settings. The method may further include the steps of: displaying a setting menu related to a predetermined position on the output image according to an operator's indication input made at the predetermined position on the output image; and updating the output image according to an operator's setting operation performed on the setting menu.

A method for setting output settings using an output image displayed on a display screen according to the invention includes the steps of: displaying an initial output image for setting output image settings on the display screen; displaying an output setting menu according to an operator's indication input made at a predetermined position on the output image, the output setting menu being related to the predetermined position; updating the output image according to an operator's setting operation performed on the output setting menu; and displaying the updated output image as the final output image and completing the setting of the output settings.

Preferably, the setting menu is displayed in response to the operator's indication input made at the predetermined position on the output image and the operator's setting operation related to the predetermined position, and the output image is updated according to the following operator's setting operation performed on the setting menu.

The method according to the invention further includes the step of determining whether the setting operation is valid, wherein when it is determined that the setting operation is not valid, displaying the output image immediately before the setting operation is made. The method according to the invention further includes the step of determining whether an output setting set according to the setting operation is valid, wherein when it is determined that the output setting is not valid, displaying an error message and displaying the output image immediately before the setting operation is made.

It is preferable that an item of the output setting be determined by the predetermined position and the setting operation related to the position. The output setting includes at least one selected from the group of a monochrome/color setting, a darkness (or tint) setting, an image quality setting, an enlargement/reduction setting, an N-in-1 (integration) setting, a margin setting, a both-sided print setting, centering, removal of frame, a document orientation setting, stapling, punching, a document size setting, a paper size setting and sorting.

The predetermined position is selected from the group of the center, the corners, the periphery, the edge, and the outer periphery of the display area of the output image.

The indication input includes pointing at the predetermined position by the operator and the setting operation is selected from the group of continuous or intermittent pointing at the predetermined position, a horizontal pointing shift, a vertical pointing shift, a rotational pointing shift, and an oblique linear pointing shift at the predetermined position by the operator, and a pointing shift crossing the display area of the output image.

Preferably, the method according to the invention further includes displaying an operating icon for guiding the setting operation and the step of resetting the output image in response to a predetermined setting operation to return the output image to the initial output image.

According to the invention, there is provided a program product for an image processing system or a computer system including at least one of a printer, a scanner, a facsimile machine, and a copying machine for performing setting of output settings using an output image displayed on a display screen. The program product includes: program code for displaying an initial output image for setting output image settings on the display screen; program code for switching to a mode of inputting the output image settings according to an operator's indication input made at a predetermined position on the output image; program code for updating the output image according to an operator's setting operation following the indication input by the operator; and program code for displaying the updated output image as the final output image when the setting operation is stopped by the operator and completing the setting of the output settings.

According to the invention, there is provided a program product for an image processing system or a computer system including at least one of a printer, a scanner, a facsimile machine, and a copying machine for performing setting of output settings using an output image displayed on a display screen. The program product includes: program code for displaying an initial output image for setting output image settings on the display screen; program code for displaying an output setting menu according to an operator's indication input made at a predetermined position on the output image, the output setting menu being related to the predetermined position; program code for updating the output image according to an operator's setting operation performed on the setting menu; and program code for displaying the updated output image as the final output image and completing the setting of the output settings.

The program product for the image processing system or the computer system according to the invention further includes: program code for determining whether the setting operation is valid; and program code for determining whether the output setting set according to the setting operation is valid.

ADVANTAGES OF THE INVENTION

The output-image setting method according to the invention can reduce transition of the display screen. In other words, the invention has the advantage of preventing lower-level (or deeper-level) menu display, thereby improving its operability. Moreover, a setting menu is displayed as necessary, so that the entire display screen can be simplified. The setting operation using an output image according to the invention is intuitive, allowing an actual operation to be made visually on the screen. This provides easy-to-set environment for beginners who are unfamiliar with technical terms of the setting function. This also provides the settings closer to operator's thought process during the setting operation. In other words, the invention allows high-usability output settings that allow the operator to create an output image by intuition.

BEST MODE FOR CARRYING OUT THE INVENTION

The best mode for making output settings using an output image displayed on a display screen, including printer settings, according to the invention will be described herein below with reference to the drawings. However, it will be appreciated that the invention is not limited to the embodiments set forth herein, but could be expended to cover others embodiments. Any such expansion are deemed to be covered by claims set forth herein.

BRIEF DESCRIPTION OF THE DRAWINGS

FIG. 10, including (a) and (b), shows an example of a method for an N-in-1 setting according to the invention.

FIG. 15 shows an example of a set-item correlation table in which print setting items, setting positions on the output image, and setting operations are listed.

FIG. 16 is a functional block diagram of an output-image-setting control section according to the invention.

DESCRIPTION OF THE INVENTION

Figure 1:
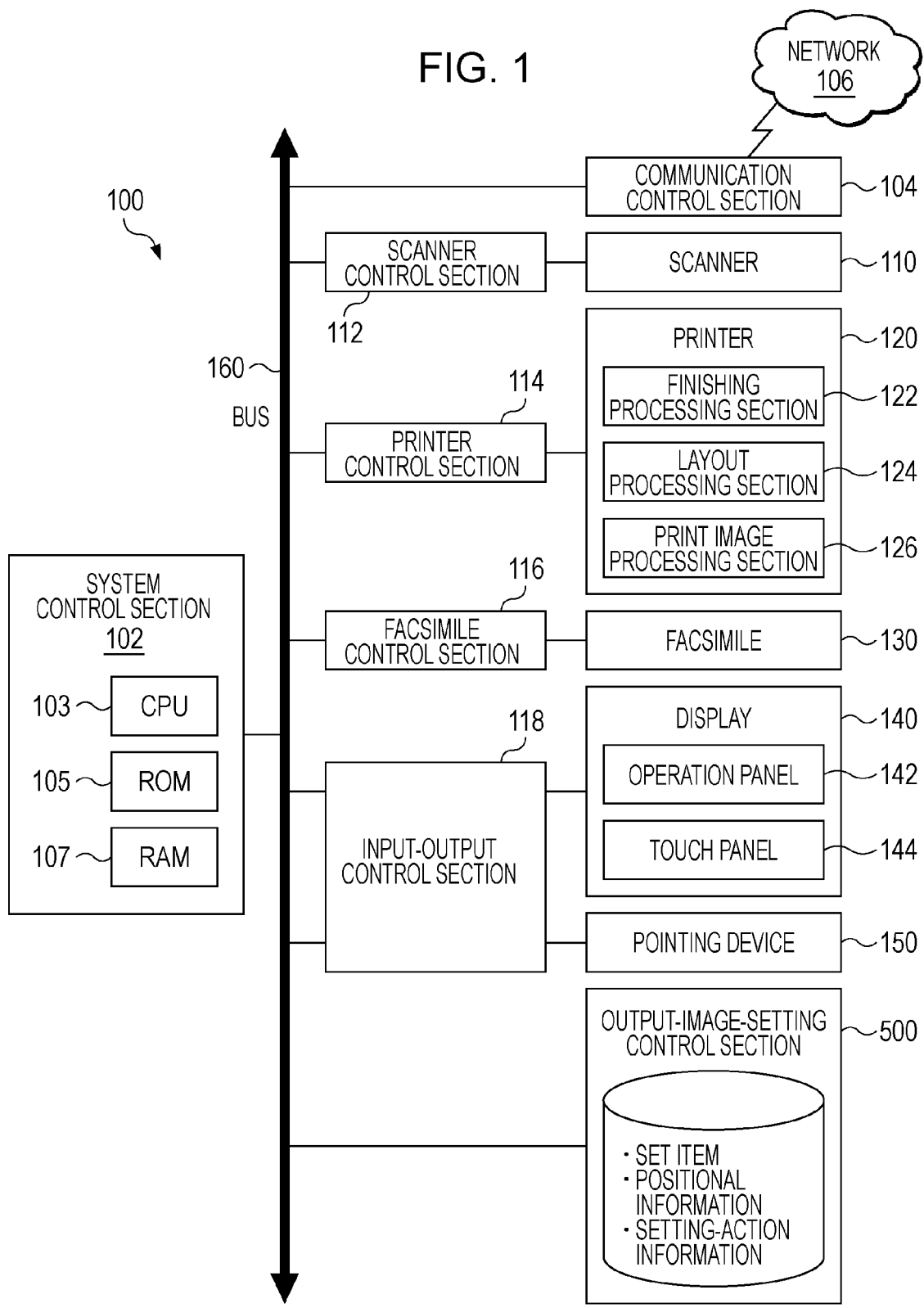
FIG. 1 is a block diagram of a multifunctional image processing system according to teachings of the invention.

FIG. 1 is a configuration example of an image processing system 100 according to an embodiment of the invention for setting various functions on a display screen including an output image. Output settings for a printer 120 will be principally described. However, note that output settings for a scanner 110, a facsimile machine 130, and a copying machine (not shown), can also be made in a similar manner. The invention allows output settings by displaying an output image, which is an output form image, including various image processing information data on a display screen 200 (see FIG. 2) of a display subassembly 140, hereafter termed display 140. The configuration of the image processing system 100 will be described later.

Figure 2:
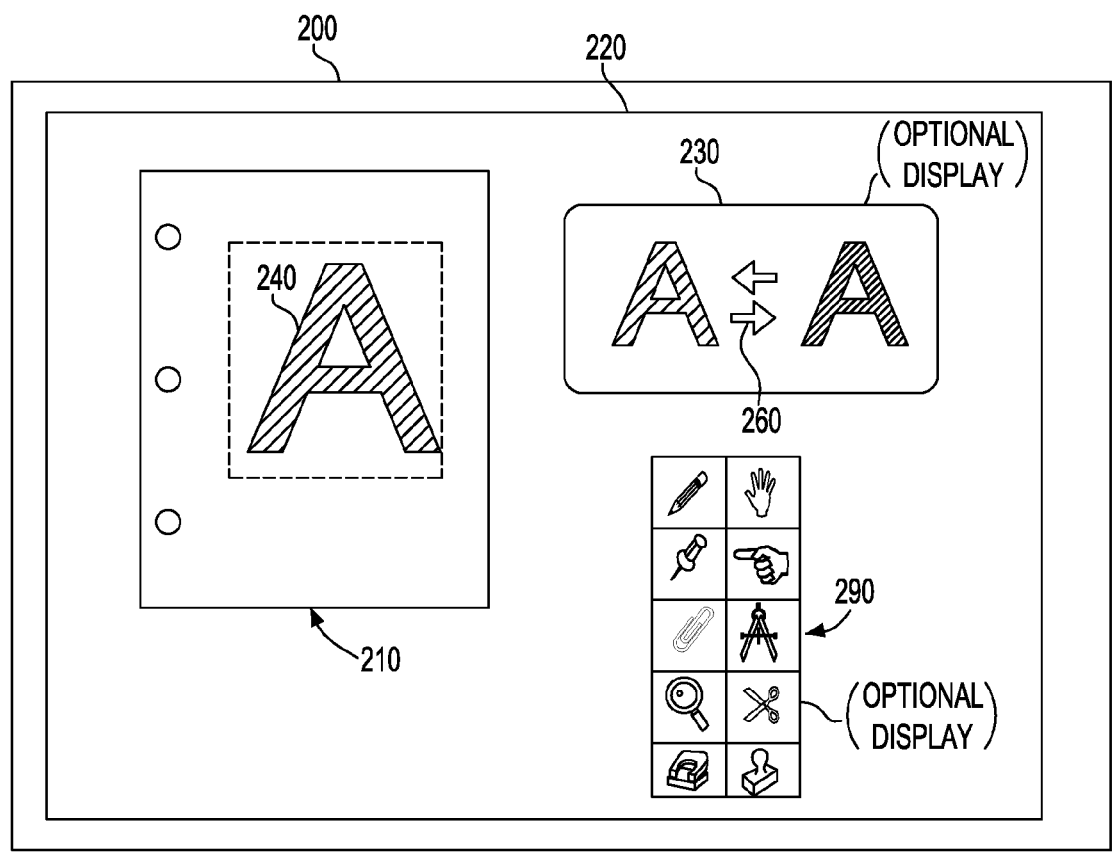
FIG. 2 is a diagram showing an example of a display screen including an output image which is an output form of image processing information according to the invention.

FIG. 2 shows an example of the display screen 200 for various output settings using an output image, that is, a schematic diagram showing a display screen for directly setting an output form on the output image by inputting data on various output setting items. The output image can display the output forms of various setting items. The display screen 200 is the display area of, for example, a liquid crystal display having a touch panel. The display screen 200 includes an output image (in other words, an image showing a finished output image) 210 which is an object of setting operations and a setting menu 230 including a line and a diagram for assisting setting operations. The display screen 200 may further include an auxiliary menu 290 which is displayed optionally to produce a desired output image 210. The auxiliary menu 290 may be an auxiliary tool box in which, for example, various tool icons are arranged. The area of the output image 210, the setting menu 230, and the auxiliary menu 290 is referred to as a canvas area 220. The canvas area 220 may display additional necessary icons for the operator to produce output forms.

The output image 210 includes an image quality icon 240 indicative of image-quality related information in, for example, the center. The image-quality related information includes such as selection between monochrome and color, darkness, and resolution. FIG. 2 shows the image quality icon 240 expressed by shadowed character A for the sake of clarity; however, it may be an icon in another form devised to present more detailed image quality. Preferably, the setting menu 230 is displayed directly on the output image 210. A linear or pictorial operating icon for guiding a setting operation may be displayed on the output image 210 if necessary. The setting menu 230 may be displayed not on the output image 210 but in another area in the canvas area 220 as shown in FIG. 2.

A method for setting output settings using the output image 210 including output forms displayed on the display screen 200 is classified roughly into the following two modes: a mode A in which setting items are directly displayed as updated images on the output image, and a mode B in which setting items are displayed as a set menu. "An updated image" in the following description indicates an output image in the process of setting. Specifically, the mode A is a setting method whereby at least part of an output image is updated directly, and the mode B is a method for setting output settings whereby the setting menu 230 for the output image 210 is displayed and the operator operates the setting menu 230.

One of the characteristics of the invention is that various setting items for output settings are determined according to a combination of an output-image set position and a setting operation for the set position. The set menu is displayed on the output image; alternatively, it may be displayed outside the area of the output image. The input by the operator includes an indication input for selecting a predetermined position of an output image and an input by a setting operation for the predetermined position.

Figure 3:
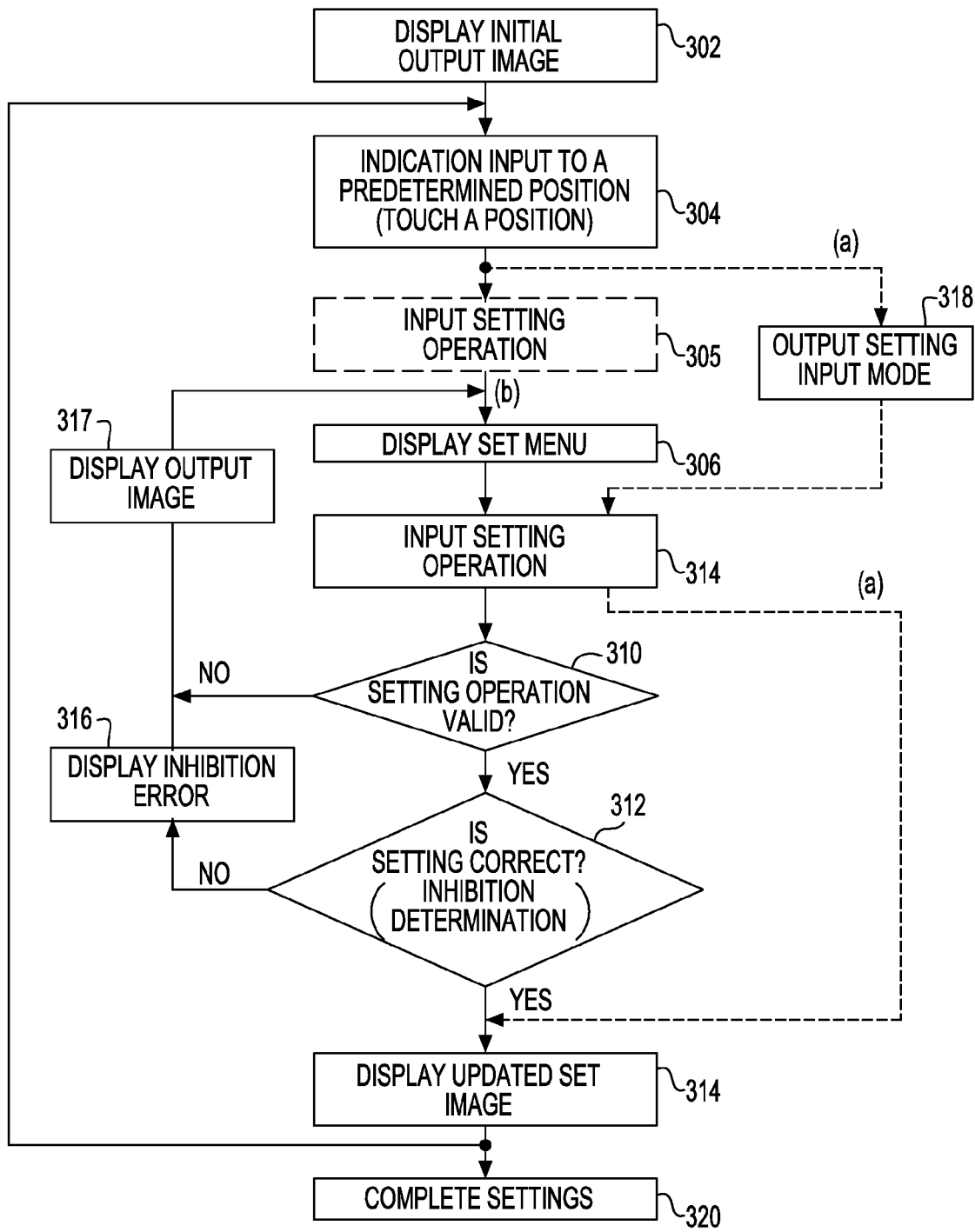
FIG. 3 is a flowchart for setting an output image according to the invention.

FIG. 3 is a flowchart for setting various setting items on image processing using an output image, according to the invention. The steps indicated by a dotted line (a) in FIG. 3 are part of the method of the mode A in which an output image is updated and set directly. This method is as follows: First, an initial output image for setting an output image on the display screen is displayed (step S302). Second, an indication input is made on a predetermined setting position on the output image by the operator (step S304). For example, when the operator touches the touch panel with his/her finger, a setting position (or a setting item corresponding to the position) is determined and the process enters into an output setting input mode for the output image (step S318). Then, a setting operation is input to the position by the operator (step S308). The setting operation is, for example, an action to continuously push the position on the touch panel with his/her finger. In response to the input of the setting operation, an updated image of the setting item is displayed (step S314). The updated image can be updated in sequence according to the inputs of setting operations. To confirm the output of each setting item, the action of stopping the setting operation, for example, releasing the finger is made. In response to this action, the updated image displayed at that time is confirmed as an output image. The above steps are repeated for other setting items as necessary; the setting operation for each item is stopped to make a desired output setting so that a desired final output image is confirmed, and thus the setting is completed (step S320). The initial output image can be a reference-setting output image (default value) or, alternatively, the latest completed output image.

The steps indicated by a solid line (b) in FIG. 3 indicate the method of the mode B in which settings are made by setting operations on a setting menu. First, this method displays an initial output image for setting an output image on the display screen (step S302), as in the mode A. Second, an indication input is performed on a predetermined setting position on the output image by the operator (step S304). Then, a setting menu related to the position is displayed in response to the input (S306). Then, a setting operation is input to the setting menu by the operator (step S308). The output image that expresses various setting items is updated in response to the input (step S314). The above steps are repeated as necessary to generate a desired updated output image, that is, an output image in which various setting items are confirmed as the final output image, and the settings are completed (step S320). The set menu may be displayed in response to a combination of the operator's indication input made at a predetermined position on the output image (step S304) and the operator's input of setting operations related to the position (step S305), that is, a combination of the indication input and the setting operation input.

Preferably, after the input of a setting operation, it is determined whether the operator's setting operation such as the action of continuously pushing a setting position on the touch panel is valid (step S310). If it is determined that the setting operation is invalid (for example, the continuously pushing action is not allowed), the output image immediately before the setting operation is made is displayed again (step S317), and the screen returns to the set menu that is not updated by the setting operation. When another allowed setting operation is made, for example, the setting position on the touch panel is intermittently pushed (tapped on), the process can move to the next step.

More preferably, it is determined whether the output setting itself by the setting operation is valid (step S312). If it is determined that the setting is invalid (for example, an enlargement of the document size is not allowed), an error message is displayed (step S316), and the output image immediately before the setting operation is made is displayed again (step S317), and the display returns to the set menu. The determination of whether the setting is valid is referred to as an inhibition determination, and an error displayed by the determination is referred to as an inhibition error. These determination steps 310 and 312 are generally applied to the B-mode setting method; however, it may also be applied to the A-mode setting method.

The combination of the methods of (a) and (b) in FIG. 3, that is, the combination of the A-mode method and the B-mode method may be used.

The operator's indication input made at a predetermined setting position on the output image includes touching a predetermined position on the touch panel with his/her finger to point at the position, that is, a pointing input. Examples of the setting operation include continuous or intermittent pointing at a predetermined position by the operator, a horizontal pointing shift, a vertical pointing shift, a rotational pointing shift, and a diagonal linear pointing shift from a predetermined position, and a pointing shift across the output-image display area. However, the indication input and the setting operation input are not limited to the above actions but include other input actions. For the indication input and the setting operation input, a pointing device selected from the group of a touch panel, a pointing stick, a stylus pen, a mouse, and a joystick. To detect positional information, a digitizer or a tablet may be used.

The invention is characterized in that setting items related to various outputs to be displayed on the output image are determined by a predetermined position on the output image and setting operations corresponding to the position. This facilitates operations corresponding to a position on the output image at which various setting items are generally displayed. For example, the output settings proceed in such a manner that the operator pushes (taps on) the touch panel at the left end of the output image with his/her finger to bore a hole in the document to be printed, while picturing a punching process at the left end of the output image. The invention thus allows provision of a graphical user interface (GUI) capable of the final output setting, that is, finish settings according to the thought process of the operator.

FIG. 1 shows a configuration example of the image processing system 100 used in the invention. The image processing system 100 includes a system control section 102, a communication control section 104, the scanner 110, the printer 120, and the facsimile machine 130 which are image processing units, and the display 140 and the pointing device 150 which are input and output units. The system further includes an output-image-setting control section 500 for controlling output-image settings. The output-image-setting control section 500 controls output settings according to various setting items, positional information, and setting action information. The system control section 102 controls the entire image processing system 100, for which the system control section 102 includes a CPU 103, a ROM 105, and a RAM 107. The communication control section 104 controls data communication with an external device connected by a network 106. This system can further include a scanner control section 112, a printer control section 114, and a facsimile-machine control section 116 for controlling the respective image processing units. The image processing system 100 is preferably a multifunctional peripheral (MFP).

The printer 120 includes a finishing processing section 122, a layout processing section 124, and a print image processing section 126. The finishing processing section 122 performs orientation of documents, stapling, and punching. The layout processing section 124 performs an enlargement/reduction setting, an N-in-1 (integration) setting, a margin setting, and double-sided printing. The print image processing section 126 performs image-quality processing including a darkness setting, selection between monochrome and color, and determination on picture printing.

The display 140 which is an input and output unit includes an operation panel 142 having a touch panel 144 that displays the display screen 200 (FIG. 2). Preferably, the operation panel 142 is a flat display such as a liquid crystal display. Entry of positional information, or indication input, is performed, for example, by the operator pushing a predetermined position of the touch panel 144 on the display screen of the operation panel 142 including the output image with his/her finger. Furthermore, for example, when the operator continuously pushes the position with his/her finger, setting operations can be input. In place of the input using the touch panel 144 and the operator's finger, a digitizer capable of detecting positional information (a combination of a pen-type device for pointing a position on the screen and a panel-type device for detecting the position) or a tablet can be used. As another alternative, various types of pointing device 150 such as a mouse, a joystick, and a stylus pen may be used.

A concrete example of the method for setting output settings related to printing according to the invention will be described while an output image, or an output form, is displayed on the display screen. The method will be described for the case of input means on a touch panel using an operator's finger. In place of the operator's finger, another type of pointing device such as a stylus pen, a touch pen, or a mouse may be used. In place of the touch panel, an input device which is used in game machines and can obtain operator's spatial motion as input information may be used. Note that the method according to the invention can be used not only for output settings on printing but also for settings of various functions of image processing such as facsimile machines, copying machines, and scanners.

Figure 4:
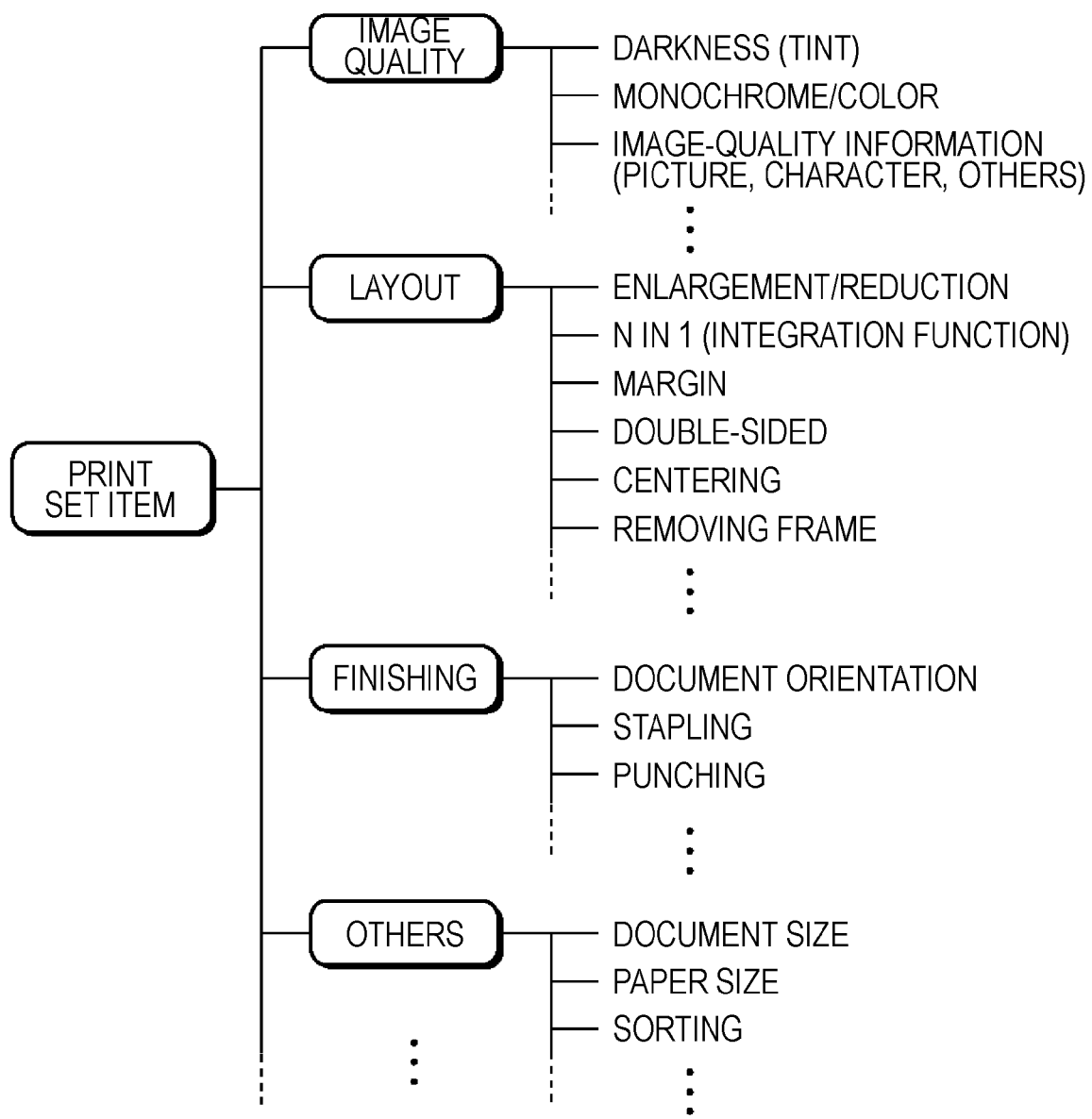
FIG. 4 is a diagram showing an example of print setting items according to the invention.

FIG. 4 shows an example of setting items related to print output. The print setting items include image-quality related items, layout related items, finishing setting items, and other items. The image-quality related items include selection between monochrome and color, density indicative of darkness, and image-quality related information, like picture or character printing. The layout related items include enlargement/reduction, N-in-1 for printing N pages on one sheet of paper with N having a numerical value, margin, double-sided printing, centering, and removing the frame. The finishing setting items include document orientation, stapling, and punching. Other items include document size, paper size, and sorting.

The setting position on the output image can be selected from the center, corners, periphery, edge, and outer peripheral area of the output-image display area (see FIG. 2). Preferably, the setting position can be agreed with a location at which settings related to actual printing may be generally made. The setting position is an area to which the operator can make an input (an indication input at a position and a setting operation input to the position) by touching the touch panel with his/her finger. That is, the indication input made at the setting position triggers access to various setting items. In addition to the indication input made at the position, the setting operation input subsequent to the indication input may trigger access to various setting items. The indication input includes touching a setting position on the touch panel with the operator's finger. The setting operation includes the action of pushing the setting position on the touch panel with the operator's finger again or sliding the finger from the position.

Figure 5A:
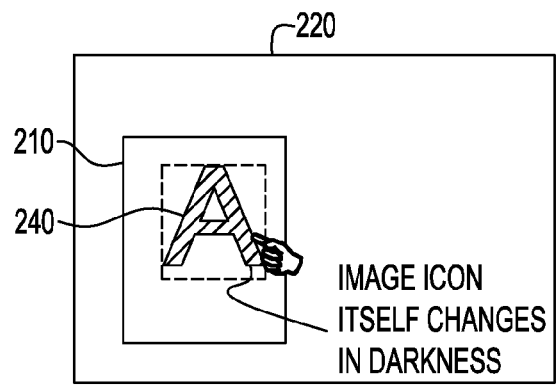
FIG. 5, including (a) and (b), illustrates examples of a method for setting image-quality related information according to the invention.

The image-quality related settings of printing will be described hereinbelow. FIG. 5 illustrates the operation of setting the darkness (or tint) of an image. As shown in FIG. 5(a), the output image 210 represents a finished image area of output settings. For example, when the operator continuously pushes the image quality icon 240 in the output image 210 on the touch panel covering the image quality icon 240, the image quality icon 240 itself changes in darkness among "light", "medium", and "dark" in sequence. After "dark", "light" may be displayed in cycles. By stopping the setting operation at a desired output image, the output image at the stop can be the final output image of the darkness setting. It is more preferable in terms of visualization of the setting that the color of the character A of the image quality icon 240 is actually changed from "light" to "dark" in sequence. Numeric or character information indicative of darkness may be displayed together.

Figure 5B:
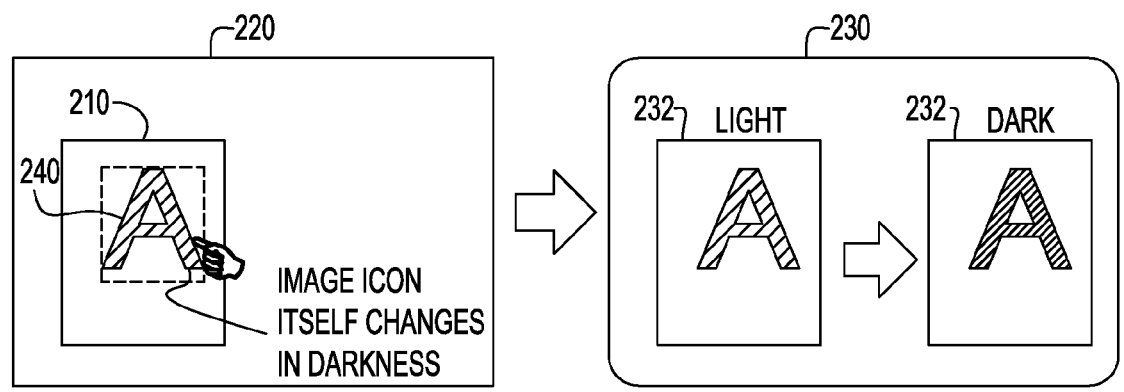

As shown in FIG. 5(b), an output setting menu (hereinafter, also referred to as a setting icon) 230 is displayed. The setting menu 230 displays option icons 232 indicative of different darkness indications. In this case, a desired darkness may be selected from the option icons 232 by the operator's touch input operation.

With the method of FIG. 5(a), the screen enters into an output-setting input mode when the operator touches the image quality icon 240 without displaying the setting menu 230. When the operator intermittently touches (taps on) the image quality icon 240, the image quality icon 240 on the output image 210 is updated in sequence, so that desired darkness can be selected. In this case, the darkness of the image quality icon 240 when the touch input is stopped can be determined as the final output image. That is, this setting method is the mode A in which setting items are directly displayed as an updated image by touch inputs. This setting flow corresponds to the steps indicated by the dotted line (a) in FIG. 3.

With the method of FIG. 5(b), the setting menu 230 is displayed, on which the operator moves pointing or performs point movement vertically. At that time, the operator can select a desired option icon 232 by stopping the point movement to set the final output image. This is the mode B in which setting items are displayed as a setting menu. This setting flow corresponds to the steps indicated by the solid line (b) in FIG. 3. A setting method using both of the mode A and the mode B is also possible.

Figure 6A:
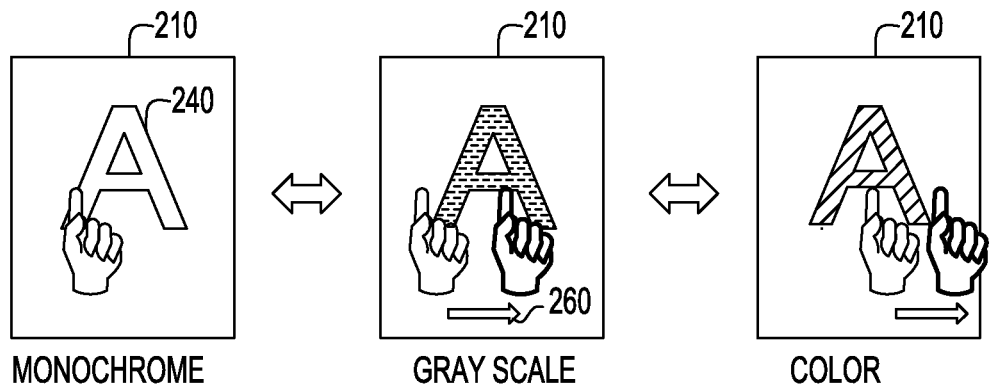
FIG. 6, including (a) and (b), illustrates examples of a method for setting monochrome or color display according to the invention.

FIG. 6 shows setting examples of other image-quality related information. FIG. 6(a) shows an example of a method for setting monochrome or color display. For example, the operator shifts his/her finger from side to side on the surface of the touch panel that covers the image quality icon 240 in the output image 210. When the touching finger shifts to the left of the image quality icon 240, the image quality icon 240 can be updated to an "monochrome" image; when the finger shifts to the center, the image quality icon 240 can be updated to a "gray" image; and when the finger shifts to the right, the image quality icon 240 can be updated to a "color" image. It is also possible to display an operating icon 260 (for example, rightward and leftward arrows) for guiding the operation of setting monochrome or color when the operator shifts his/her finger laterally.

Figure 6B:
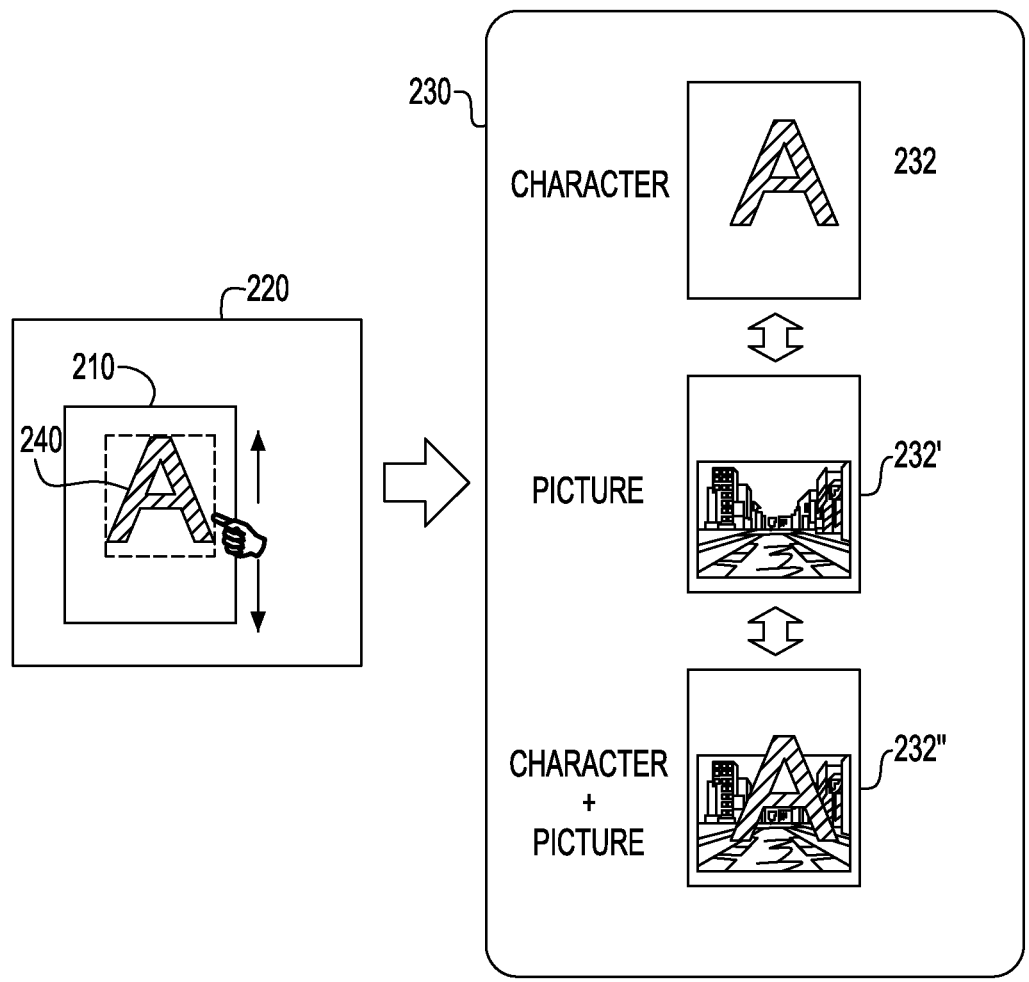

FIG. 6(b) shows a method for setting image-quality related information, like a character or a picture. For example, the operator shifts his/her finger up and down on the touch panel that covers the image quality icon 240 in the output image 210. This setting operation causes the setting menu 230 to be displayed. When the touching finger shifts upward with respect to the image quality icon 240, the image quality icon 240 that represents "character information" is displayed in the setting menu 230; when the finger shifts to the center, the image quality icon 240 that represents "picture" is displayed in the setting menu 230; and when the finger shifts downward, the image quality icon 240 that represents "character and picture" is displayed in the setting menu 230. This is confirmed when the operator stops his/her finger at a desired option icon 232. Alternatively, three option icons 232 may be displayed at the same time, among which a selected one may be highlighted. Both of the display methods allow the operator to perform output settings by stopping his/her finger at a desired position while viewing the option icons 232.

Figure 7:
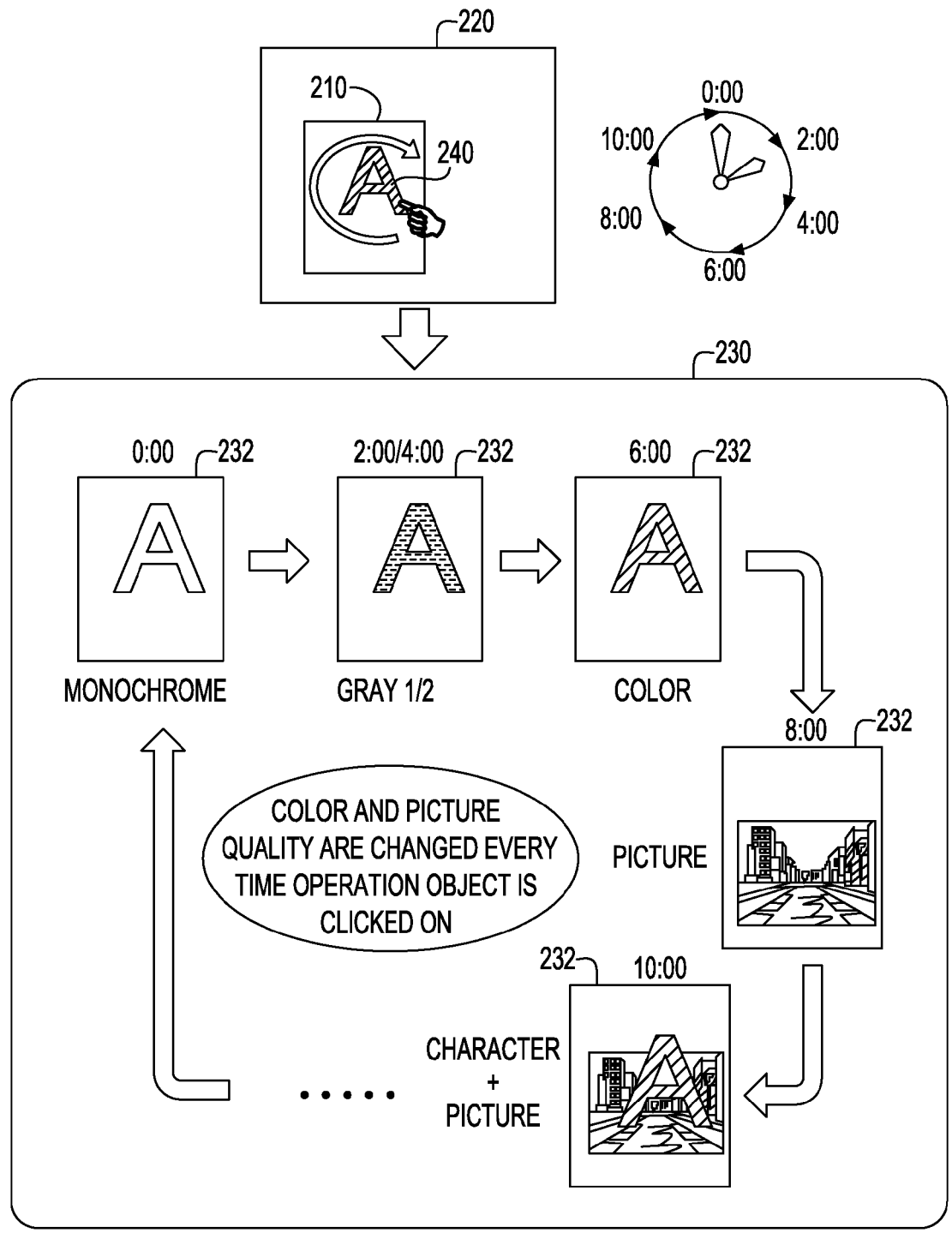
FIG. 7 illustrates an example of a method for setting monochrome or color display and image quality according to the invention.

FIG. 7 shows a setting example in which settings of monochrome/color and image quality are made at a time. As shown in FIG. 7, the operator shifts his/her finger circularly along the area including the image quality icon 240 on the touch panel of the output image 210. At that time, updated images can be displayed in sequence on the output image 210 in which the monochrome/color setting and the image quality setting are changed in correspondence with the location of the operator's finger (a position on the circle, for example, a position indicated by the hour hand corresponding to 0:00, 2:00, 4:00, 6:00, 8:00, or 10:00). In this case, the operator can select a desired setting at a position at which the operator stops his/her finger. Alternatively, the setting menu 230 including the option icons 232 may be temporarily displayed by the setting operation of the operator shifting his/her finger circularly along the area including the image quality icon 240 to allow the operator to select a desired setting by a touch input while viewing the option icons 232. As another alternative, the option icons 232 may be updated or changed in sequence as the operator clicks on a desired option icon 232 in the setting menu 230, as shown in FIG. 7.

Figure 8A:
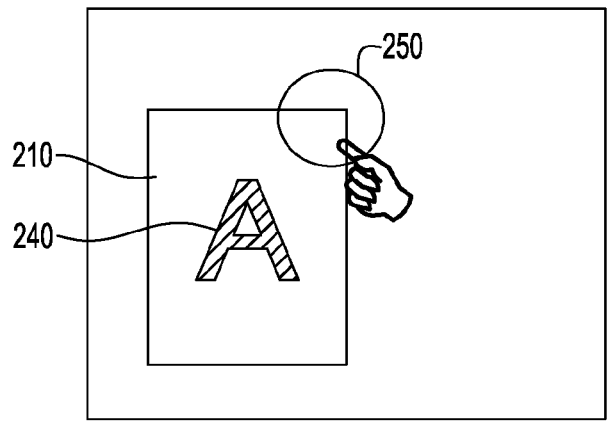
FIG. 8, including (a), (b) and (c), illustrates an example of a method for setting enlargement/reduction of a document according to the invention.
Figure 8B:
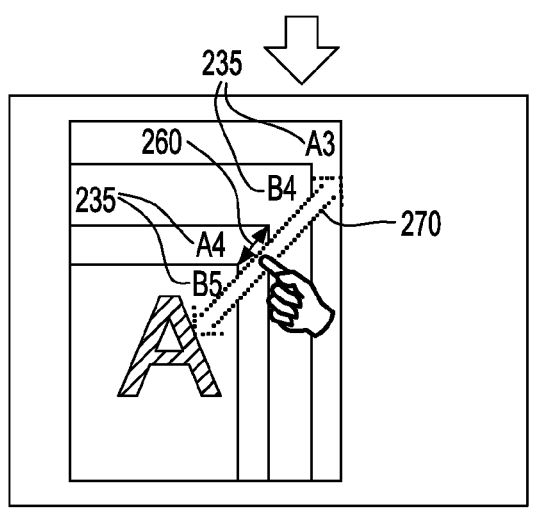
Figure 8C:
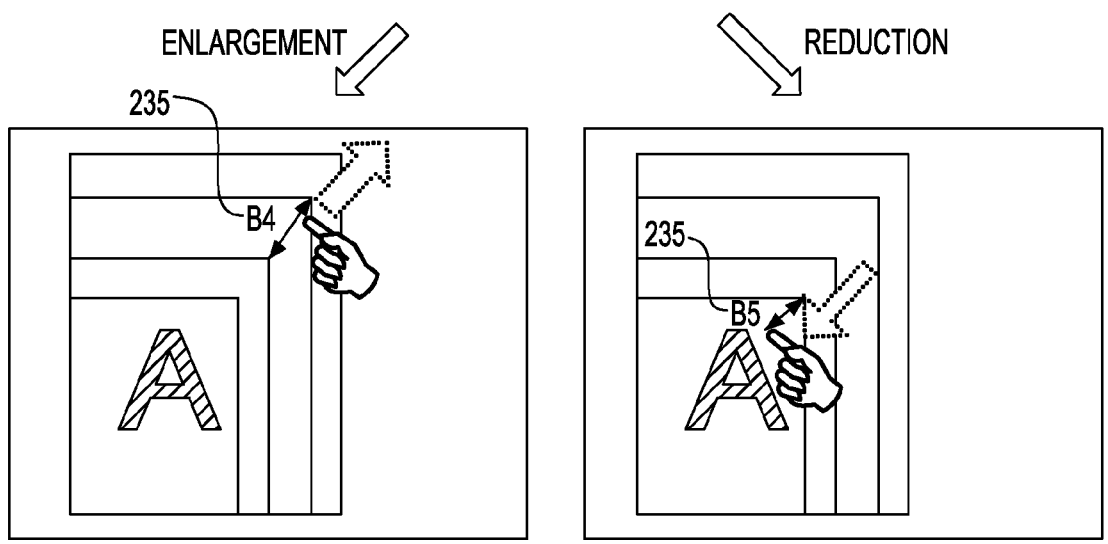

Next, print layout settings will be described. The layout settings include an enlargement/reduction setting, an N in 1 setting, a margin setting, and a double-sided print setting. FIG. 8 shows an example of a method for setting the enlargement/reduction of a document. When the operator touches an upper right end of the output image 210, which is a setting position 250 corresponding to the enlargement/reduction setting (see FIG. 8(*a*)), an updated image including an oblique-arrow operating icon 260 indicative of an enlargement/reduction setting is displayed (see FIG. 8(*b*)). The operator inputs a setting operation 270 (the motion of moving his/her finger is indicated by the dotted-line arrow for the sake of simplification) according to the indication of the operating icon 260. Here, the operation input, which is the action of obliquely drawing the operator's finger, is performed on the touch panel. In place of the finger operation, mouse drag is also possible. This setting operation causes the output image 210 to be directly updated, so that the entire output image is enlarged or reduced (see FIG. 8(*c*)). Preferably, a size indication, like B5, A4, B4, or A3, is added at the same time the size of the output image 210 is updated. For this purpose, a confirmation display icon 235 may be used to confirm the setting on character information, like B5 or A4.

Figure 9:
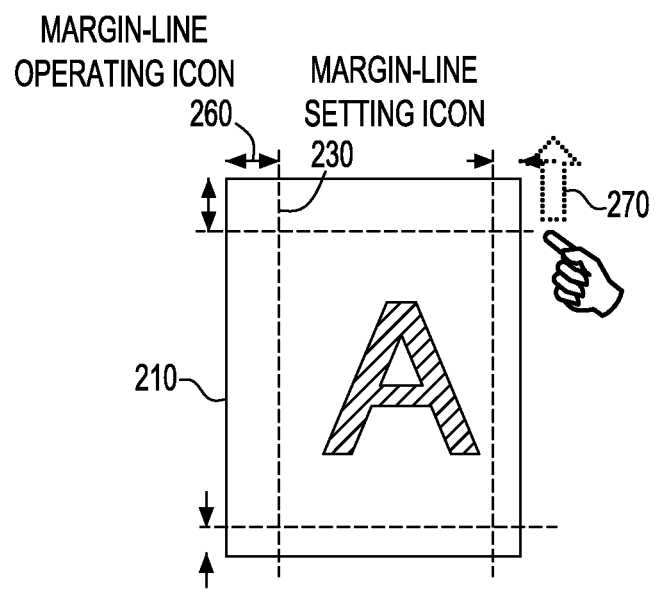
FIG. 9 illustrates an example of a method for setting a print margin according to the invention.

FIG. 9 shows an example of setting a print margin. When the operator touches a position about 1 cm apart from one side in the periphery of the output image 210, a margin-line setting icon 230 that represents a margin line for setting a margin is displayed along each side of the periphery. A margin-line operating icon 260 may be displayed if necessary. When the operator touches the dotted line and moves his/her finger vertically or laterally (a setting action 270), the size of the margin can be set. A dotted line indicative of the margin may be displayed around the output image 210 in advance. A set margin size may be represented in figures. For this purpose, it is preferable to use a combination of an input device and a touch panel capable of digitizing positional information, such as a touch pad and a digitizer.

FIG. 10 shows an example of a method for N-in-1 settings. FIG. 10(*a*) shows a setting example of the N-in-1 setting of a portrait document. The operator performs a setting operation of sliding his/her finger laterally to cut across the output image 210 in the vicinity of the center line so as to divide it into two (S1). According to this setting operation, 90°-turned two portrait images are first displayed (S2). Second, the images are automatically turned 90° in the reverse direction, so that an output image 210' having two erect images is displayed (S3). When the operator further slides the finger laterally in the vicinity of the center line of the output image 210' so as to divide the output image 210' into two, then 90°-turned four images are displayed (S4). Next, the images are automatically turned 90° in the reverse direction, so that an output image 210" having four erect portrait images is displayed (S5). In this case, the N-in-1 function may be set such that if the operator's finger is moved from the left to the right, the number of divisions is increased to advance the N-in-1 operation (indicated by the solid arrow A); in contrast, when the operator's finger is moved from the right to the left, the N-in-1 operation is reversed (indicated by the dotted arrow B). Alternatively, the N-in-1 function may be set such that the N-in-1 operation is reversed when the operator's finger is moved in the direction opposite to the first moving direction.

FIG. 10(*b*) shows a setting example of the N-in-1 setting of a landscape document. The operator performs a setting operation of sliding his/her finger vertically to cut across the output image 210 in the vicinity of the center line so as to divide it vertically into two (S1). According to this setting operation, 90°-turned two landscape images are first displayed (S2). Second, the images are automatically turned 90° in the reverse direction, so that an output image 210' having two erect landscape images is displayed (S3). When the operator further slides his/her finger vertically in the vicinity of the center line of the output image 210' so as to divide the output image 210' into two, then 90°-turned four images are displayed (S4). Next, the images are automatically turned 90° in the reverse direction, so that an output image 210" having four erect landscape images is displayed (S5). In this case, the N-in-1 function may be set such that if the operator's finger is moved from the top to the bottom, the N-in-1 operation is advanced (indicated by the solid arrow A); in contrast, when the operator's finger is moved from the bottom to the top, the N-in-1 operation is reversed (indicated by the dotted arrow B). Alternatively, the N-in-1 function may be set such that the N-in-1 operation is reversed when the operator's finger is moved in the direction opposite to the first moving direction. Similarly, three images can be displayed by selection of three crossing positions at which the whole image is divided into three approximately equal parts. A combination of trisection and bisection allows a setting from three images (3 in 1) to six images (6 in 1). Furthermore, a combination of trisection and trisection allows application to a setting from three images (3 in 1) to nine images (9 in 1). Repeating this process allows an N-in-1 operation for providing multiple images.

Figure 11A:
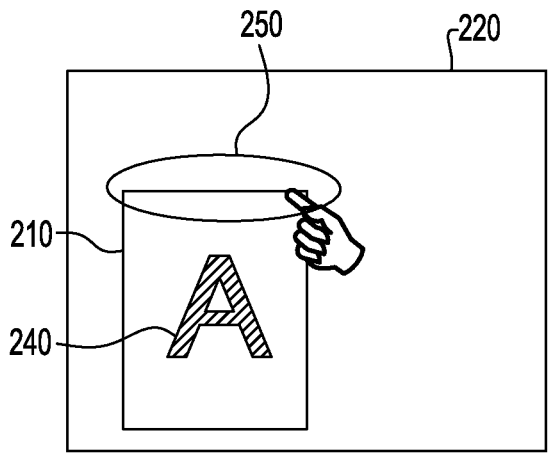
FIG. 11, including (a), (b) and (c), illustrates an example of a method for setting document orientation according to the invention.
Figure 11B:
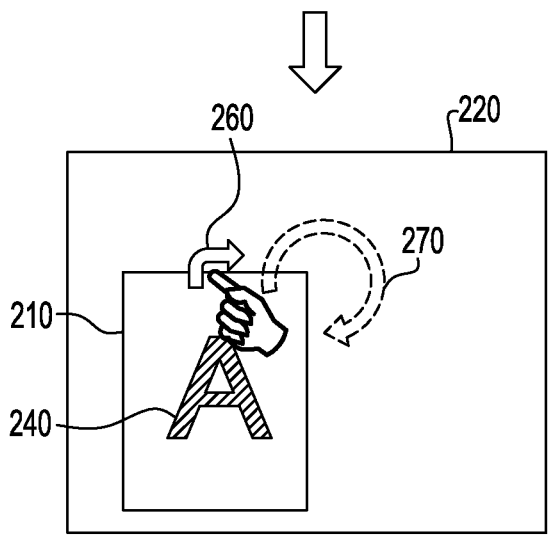
Figure 11C:
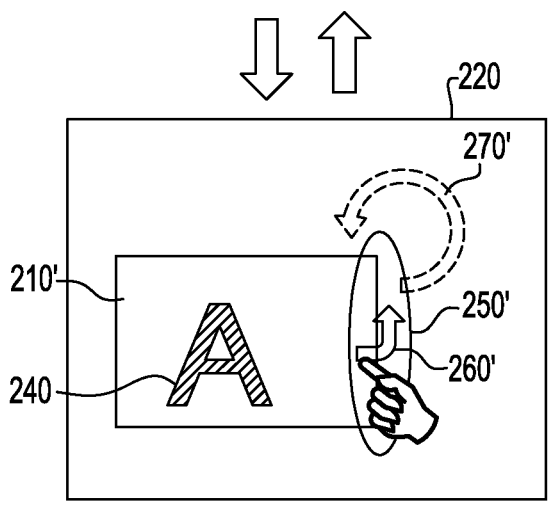

Next, settings on a finishing process will be described. Examples of the finishing include a document orientation setting, stapling, and punching. FIG. 11 shows an example of a document orientation setting using a touch panel. As shown in FIG. 11, a setting position 250 of the output image 210 in the canvas area 220 is selected by a touch input (see FIG. 11(*a*)). In this example, when the operator touches the position 250 at the upper end of the output image 210 in a portrait format with his/her finger, an operating icon 260 which is "an arrow indicative of clockwise rotation" is displayed. The operator slides his/her finger clockwise according to the operating icon 260 (see FIG. 11(*b*)). When this setting operation 270 is performed on the touch panel, an output image 210' in a landscape format is displayed in the canvas area 220 in response to the position and the setting operation 270 (see FIG. 11(*c*)). When the operator touches the right end 250' of the output image 210' in a landscape format, an operating icon 260' corresponding to the position is displayed. When the operator performs a setting operation 270' to slide his/her finger counterclockwise according to this operating icon 260', the output image 210 in a portrait format is displayed again.

Figure 12A:
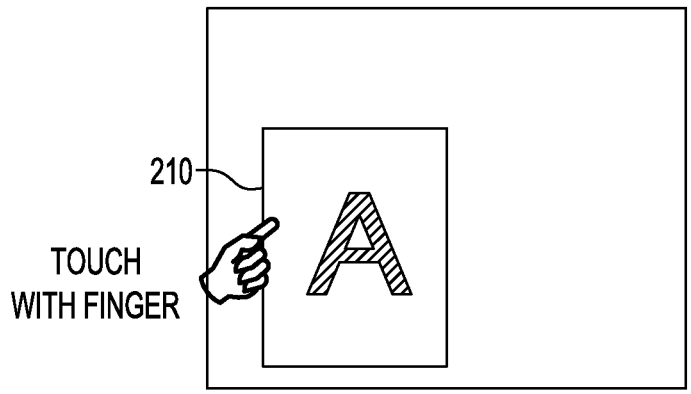
FIG. 12, including (a), (b) and (c), illustrates an example of a method for setting a stapling function according to the invention.
Figure 12B:
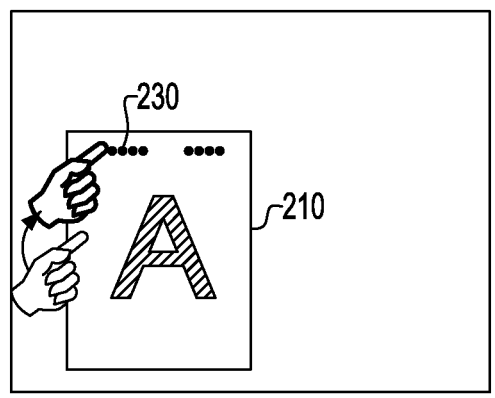
Figure 12C:
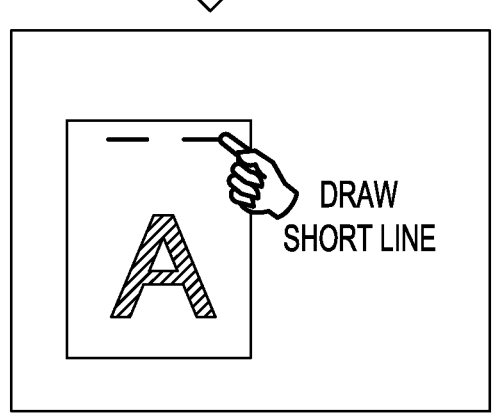

FIG. 12 shows a setting example of a stapling process. Examples of the stapling process include one-point fastening (in the vicinity of the upper left end or the upper right end) and two-point fastening (in the vicinity of the upper end, the left end, or the right end). The operator touches a stapling position on the output image 210 (see FIG. 12(*a*)). Then, a stapling setting icon 230 (here, indicated by a short dotted line) is displayed in response to this touch input. If the operator moves his/her finger on this screen so as to draw, for example, a short line, a short solid line indicative of the stapling setting is displayed (see FIG. 12(c)). As an alternative, an operating icon indicative of a stapling process, for example, a staple icon (for example, a pictorial stapler) may be displayed when the operator touches the touch surface. As another alternative, a short dotted line (corresponding to the setting icon) 230 indicative of the staple position may be displayed on the output image 210 in advance. In this case, it can be determined whether the stapling setting operation has been completed by the update of the dotted line at the setting completed position to a solid line or a thick line.

Figure 13A:
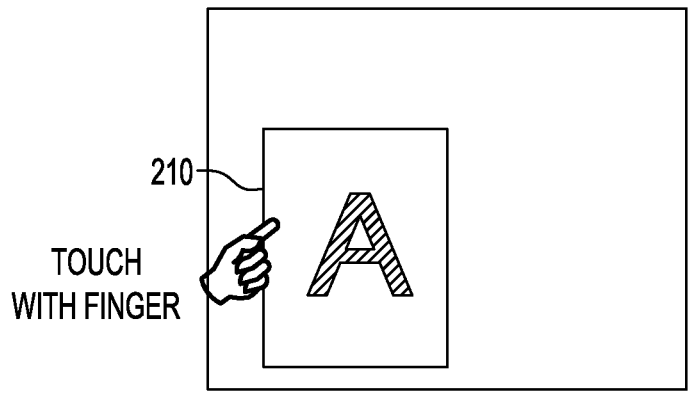
FIG. 13, including (a), (b) and (c), illustrates an example of a method for setting a punching function according to the invention.
Figure 13B:
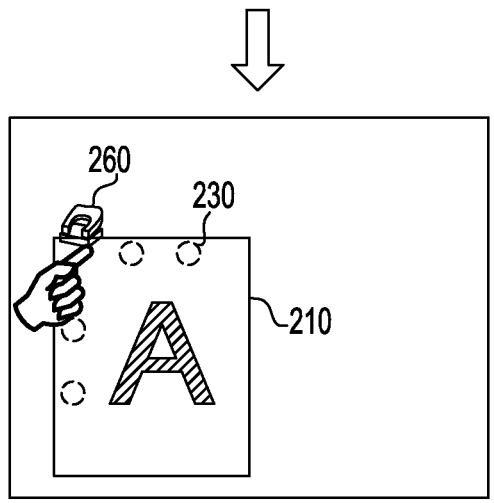
Figure 13C:
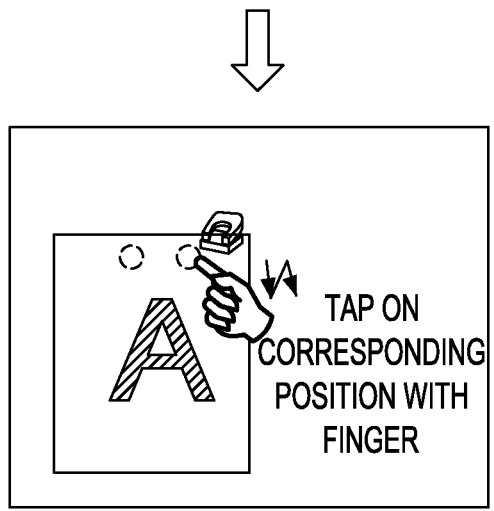

FIG. 13 shows a setting example of a punching function. Examples of the punching function include two-hole punching (in the vicinity of the upper end, the upper left end, or the upper right end) and three-hole punching (in the vicinity of the left end or the right end). The operator touches punching positions on the output image 210 with his/her finger (see FIG. 13(a)). Then, a punching setting icon 230 indicated by a dotted small circle is displayed in response to this touch input (see FIG. 13(b)). If the operator lightly pushes (taps on) the position on this screen with his/her finger, a solid small circle is displayed to allow a punching setting (see FIG. 13(c)). As an alternative, an operating icon 260 indicative of punching (for example, a pictorial punch) indicative of a punching process may be displayed when the operator touches the touch surface. As another alternative, a small dotted-line circle 230 (corresponding to the setting icon) indicative of a punch hole may be displayed on the output image 210 in advance. In this case, it can be determined whether the punching setting operation has been completed by the update of the small dotted-line circle at the setting completed positions to a small thick-line circle (or a filled small circle). The number of finger tapping operations can be reduced by the definition that two tapping operations are for two-hole punching and three tapping operations are for three-hole punching.

A case of setting stapling and punching functions substantially on the same position will be described. For example, for two-point stapling and two-hole punching in the vicinity of the left end, discrimination between the stapling setting and the punching setting can be made according to whether short lines are drawn or corresponding position are tapped on. Specifically, setting icons (short dotted lines or small dotted-line circles) can be displayed according to pointed positions and subsequent setting operation inputs to the corresponding positions. The setting flow corresponds to the series of steps S304 to S306 in FIG. 3 in which a setting position is pointed in step S304, a setting operation is input in step S305, and a setting menu is displayed in step S306 according to the combination thereof.

An example of double-sided printing (not shown) will be described. For example, when the operator touches the vicinity of the lower left end of the output image 210 with his/her finger, an operating icon, or a page-turning arrow (a clockwise semicircle starting from the left), is displayed. When the operator slides his/her finger to the right, a right-binding double-sided setting can be made. Likewise, when the operator touches the vicinity of the lower right end and slides his/her finger to the left, a left-binding double-sided setting can be made. A page-turning arrow (for example, a counterclockwise semicircle starting from the right) may be displayed as an operating icon. A top binding setting may be made by the operator touching the vicinity of the lower left end with his/her finger and sliding it upward. A page-turning arrow (for example, a clockwise semicircle starting from the bottom) may be displayed as an operating icon.

A setting to return the entire output-image settings to the reference settings (default values), that is, "to return all the settings to default settings) is referred to as "a reset setting". This reset setting may be made, for example, by the operator sliding his/her finger obliquely to the four corners of the whole display area of the output image 210 so as to draw a cross.

The method according to the invention for output settings using an output image allows the operator to display set-item setting icons (or updated images of an image quality icon) having specified functions according to a setting position and a setting operation at the position without using character information and to confirm them visually. The output image setting can be made by stopping the operation (or selection from the option icons) when a desired setting can be achieved. To facilitate the settings, an auxiliary tool box may be displayed as the auxiliary menu 290, in addition to the setting menu 230, in the canvas area 220 (see FIG. 2). The auxiliary menu 290 includes tools for assisting the settings, such as a punch icon and other icons describing setting icons and setting operations, or character information.

Figure 14:
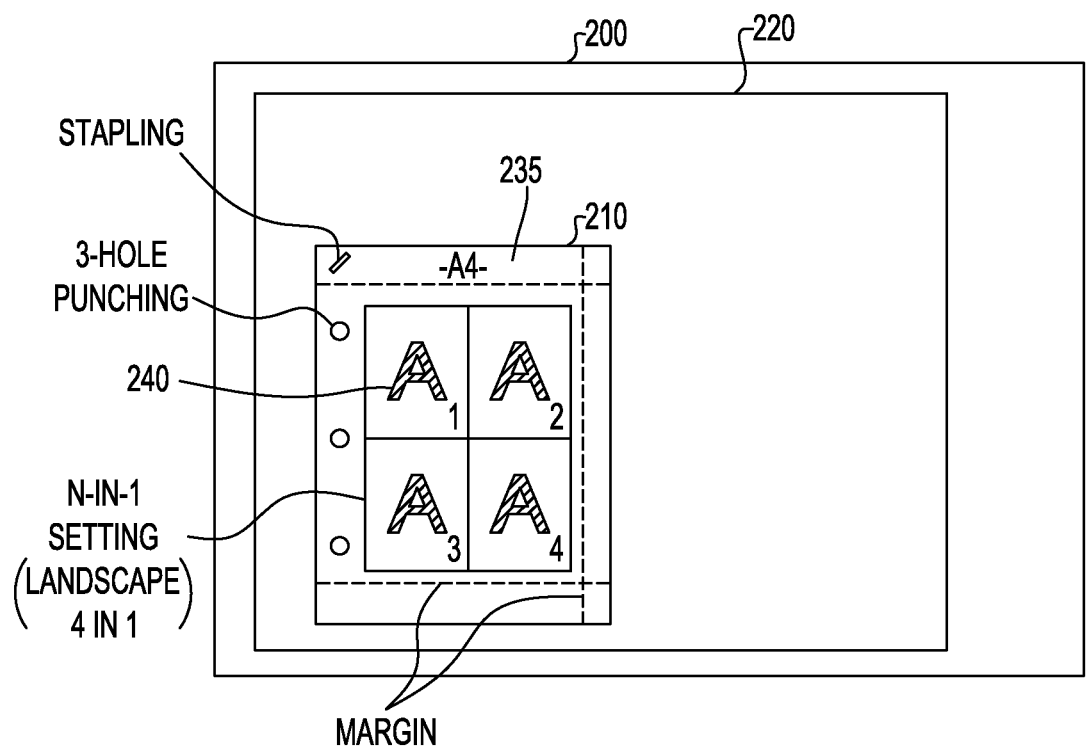
FIG. 14 is a schematic diagram showing an example of the display screen after various print settings are completed.

As described above, in selecting and setting print-related functions, various setting items can be determined from a setting position on the output image 210 and a setting operation on the position. FIG. 14 shows an example of the output image 210 after desired function settings are confirmed. In this case, a vertical print setting is shown in which stapling is set at the upper left end, three-hole punching is set in the vicinity of the left end, and margins are set at the top and the bottom and on the right side, and four A4-size portrait documents are integrated in one page. To facilitate advance confirmation of the settings before the confirmation, for example, a confirmation display icon 235 such as "A4" indicative of the paper size is displayed.

FIG. 15 shows a set-item correlation table, as an example of print settings, in which print setting items, setting positions on the output image 210, setting operations corresponding to the respective positions, and operating icons are listed. Actual setting operations are not limited to print settings. For example, various functions of scanners and facsimile machines may be preset, and a set-item correlation table in which their setting items are listed may be stored in an output-image-setting control section 500 of the image processing system 100. The procedure can be determined according to the table so that the operator can determine an indication input to be made at a position on the output image and setting operation inputs. Moreover, the set-value table may be updated every time various item settings are confirmed so that the display on the output image is updated as necessary.

FIG. 16 shows a configuration example of subassembly 500 hereafter termed the output-image-setting control section 500 for achieving the method of an embodiment of the invention (FIG. 1 shows the location thereof in the whole configuration). In other words, FIG. 16 shows a configuration example of an apparatus for controlling output-image setting on the display screen. The output-image-setting control section 500 controls output settings on image processing of the printer 120, the facsimile machine 130, the scanner 110, and the copying machine (not shown) using the printer control section 114, the facsimile-machine control section 116, the scanner control section 112, and the copying-machine control section (not shown) connected via a bus 160. The setting control section 500 can be incorporated in an image processing system capable of multifunction such as a multifunction peripheral (MFP) or a computer system connected to the printer 120, the facsimile machine 130, or the scanner 110.

The setting control section 500 controls output-image settings. Specifically, the setting control section 500 has the functions of determining operator's setting inputs (a indication input and setting operation inputs), storing set values and other information for various settings, and updating the display screen including the output image. For this purpose, the setting control section 500 includes a set-value control section 510, an input analyzing section 520, and a display control section 530. The setting control section 500 is connected to the display 140 or the pointing device 150, which is an input and output unit for inputting settings, via the bus 160 and an input-output control section 118.

The set-value control section 510 stores set values on various settings, and compares these set values with actual settings. The set-value control section 510 includes a setting storage section 512 and an inhibition determining section 514. The setting storage section 512 corresponds to a database, which manages set values (including queries, settings, and changes) including storing reference set values or set values confirmed in setting operations. The inhibition determining section 514 determines inhibited matters or values in inputting settings. In other words, the inhibition determining section 514 determines the advisability of settings according to the information to be set and the information stored in the setting storage section 512.

The input analyzing section 520 performs processing for inputting settings. The input analyzing section 520 includes an operation analyzing section 522, a positional-information analyzing section 524, and a set-item analyzing section 526. The operation analyzing section 522 determines the kind of operator's setting actions (for example, a long point push or a horizontal pointing shift). The positional-information analyzing section 524 determines what position or part of the output image the operator's indication input is made, and determines a setting item. The set-item analyzing section 526 determines what setting item and what are to be set from the positional information and the analysis of the setting operation thereto.

The display control section 530 controls the display screen including generation of an output image. The display control section 530 includes an image generating section 532, an action managing section 534, and an inhibition control section 536. The image generating section 532 generates an output-image screen that reflects a setting status. The action managing section 534 manages actions for settings, that is, the entire setting operations, to manage changes of the screen using the image generating section 532 and the inhibition control section 536 to be described later. The inhibition control section 536 manages or determines displaying error messages and option selection screens (options) based on the advisability of settings by the set-value control section 510.

An indication input and the subsequent setting operation input can be made, for example, by the operator touching a position on the output image 210 or a touch panel. In response to the inputs, in the input analyzing section 520, the positional-information analyzing section 524 analyzes the information on the position the operator's finger touches. The operation analyzing section 522 analyzes whether the setting operation corresponding to the selected position is correct. The set-item analyzing section 526 analyzes the setting item corresponding to the positional information and the setting operation. In this way, those three components 522, 524, and 526 analyze the setting inputs in connection with one another. The analysis are conducted according to the definition of the set-value correlation table shown in FIG. 15, for example. Following the analysis of those setting inputs (the indication input and the setting operation input), in the display control section 530, the image generating section 532 generates an output-image screen according to the setting inputs, and the action managing section 534 updates the screen such as displaying setting icons for setting operations and displaying operating icons for guiding the setting operations. The inhibition control section 536 determines the advisability of the settings in operative connection with the set-value control section 510 and determines a corresponding display screen (such as an error message and options) to control inhibited actions to inhibit unavailable setting operations.

Figure 17:
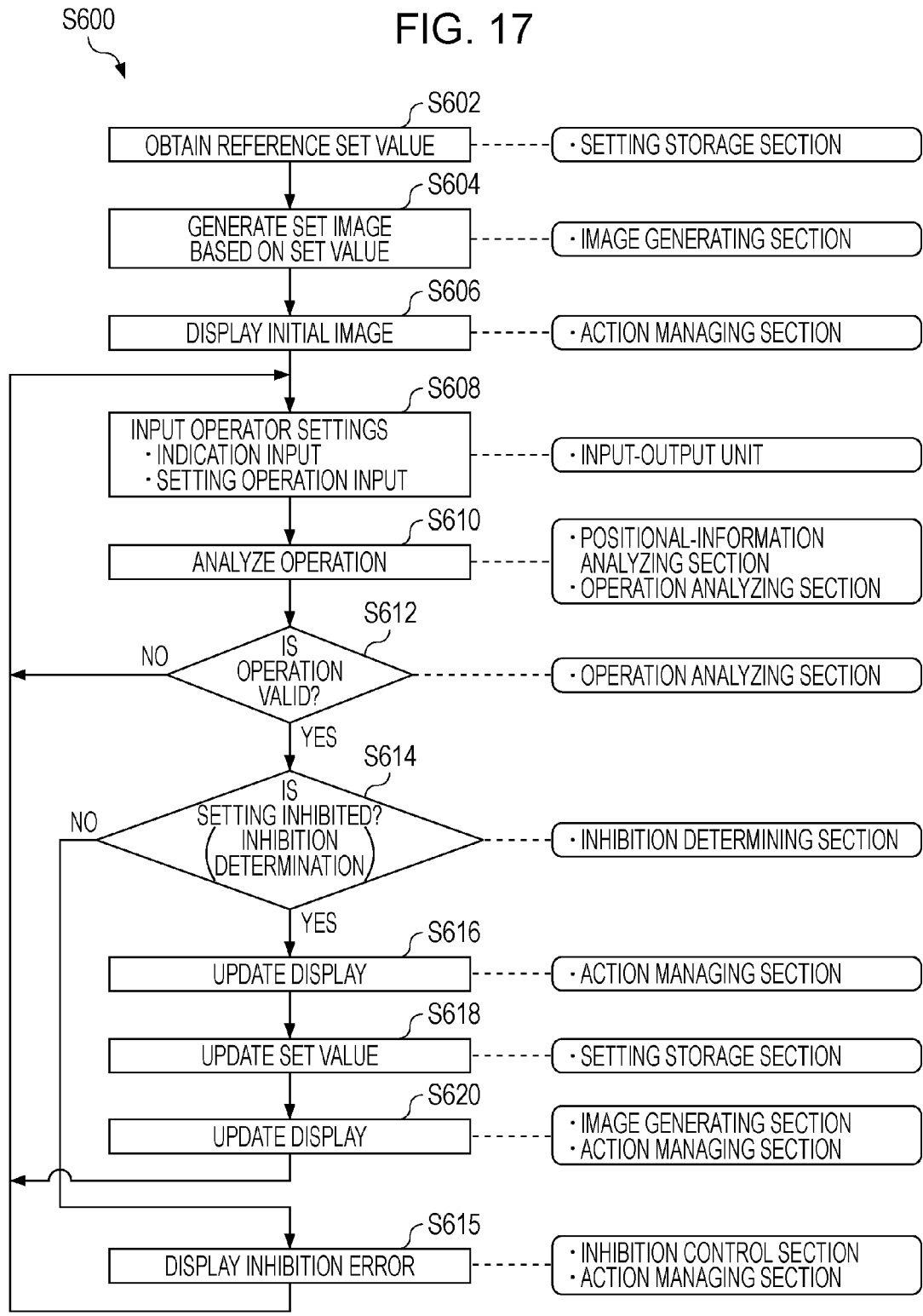
FIG. 17 is a diagram showing the relationship between the flow of the output-image settings conducted in the image processing system and the components of the output-image-setting control section, according to the invention.

FIG. 17 shows the relationship between the flow (S600) of the output-image settings conducted in the image processing system 100 and the components of the output-image-setting control section 500. First, in steps S602 to S606, an initial output image is set. First of all, a reference set value is obtained from the setting storage section 512 (S602). Then, the image generating section 532 generates a set image based on the set value. The action managing section 534 displays the generated set image as an initial image (S606). Next, setting inputs (an indication input on a position on the output image and a setting operation input corresponding to the position) are performed by the operator using an input and output unit (for example, an operation panel and a touch panel) (S608). In response to the setting inputs, the positional-information analyzing section 524 and the operation analyzing section 522 analyze the position and the operations on the position, respectively (S610). Next, the operation analyzing section 522 determines whether the setting operation is valid (S612). If the setting operation is not valid, the process returns to the operator setting inputs. If the operation is valid, then the inhibition determining section 514 determines whether the setting is valid (S614). If the setting itself is valid and not inhibited (an unpermitted setting, for example, too large a paper size), the action managing section 534 updates the display screen to the next step S616). At that time, the set value in the setting storage section 512 is updated (S618). Then, the image generating section 532 generates an output image, and the action managing section 534 updates the screen (S620). If it is determined in step S614 that the setting is not valid, that is, the inhibition control section 536 determines that the setting is inhibited, then the action managing section 534 displays an inhibition error message (S615). Following the inhibition error indication, the process returns to the operator setting input again. By repeating steps S608 to S620, various output setting items are confirmed, with which the output image is updated.

The invention includes a program for setting outputs using an output image displayed on the display screen of an image processing system or a computer system having an output-image-setting control section and at least one of a printer, a scanner, a facsimile machine, and a copying machine. The program has program code for the system to execute the steps shown in FIG. 3 (or FIG. 17). More specifically, the program has program code for the system to display an initial output image for setting an output image on the display screen; to switch the display screen to a mode of inputting settings for outputting the image according to an operator's indication input made at a position on the output image; to update the output image according to operator's setting operations following the indication input; and to display the updated output image as the final output image when the setting operation is stopped by the operator and complete the settings.

The program has program code for the system to display an initial output image for setting an output image on the display screen, to display and setting menu related to a position on the output image according to an indication input by the operator, to update the output image according to operator's setting operations on the setting menu, and to display the updated output image as the final output image and complete the settings.

The output-image setting program executed by the image processing system can be stored, in an installable or executable file format, in readable recording media such as CD-ROMs, flexible disks, or CD-Rs. The CPU 103 (also termed computer) included in the system control section 102 of FIG. 1 reads the setting program from such a storage medium (also termed tangible computer readable medium) to load it on a main storage unit, makes the components of the output-image-setting control section 500 execute the respective steps for achieving the output settings.

The output-image setting program can be stored on a computer connected to a network, like the Internet, and downloaded via the network for provision.

This invention finds use in many technologies including settings on image processing in a multifunctional image processing system.

While the invention has been described with reference to FIGS. 1 to 17, the invention is not limited to those embodiments. It will be understood by those skilled in the art that many modifications can be made without departing from the spirit and scope of the invention.

The invention claimed is:

1. A method for setting output settings on a touch screen display of a multifunction peripheral, the method comprising the steps of:
    displaying an initial output image for setting all output image settings on the touch screen display;
    designating a single predetermined position on said initial output image;
    inputting output image settings including continuously pushing the single predetermined position on said initial output image;
    displaying an output setting menu wherein said output setting menu relates to the predetermined position on said initial output image;
    performing setting operations, including vertical movement of a pointing device, on said output setting menu;
    displaying an image quality icon for displaying image quality related information relating to said setting operations performed on said output setting menu;
    performing an indicative input operation at said single predetermined position on said initial output image;
    switching the display screen to a mode for inputting the output image settings on said initial output image;
    executing a reverse setting operation on the output setting menu operating icon to return the output image to the initial output image wherein the output image and the initial output image are displayed simultaneously during the reversed setting operation and wherein said predetermined reversed setting operation includes drawing a cross within a whole display area of the output image;
    updating the output image according to the output image settings made directly on said initial output image; and
    displaying the updated output image as the final output image when setting operations are stopped, wherein the indicative input operation and output image settings are performed directly on the initial output image so displayed and the indicative input operation identifies an initial location on the initial output image from which all subsequent output image settings extend.

2. The method according to claim 1 further comprising the steps of:
    displaying a setting icon, within said output setting menu, with an indicium indicating a setting operation to be executed; and
    updating the output image according to the setting operation performed on the output setting menu.

3. The method according to claim 1, wherein an item of the output setting is determined by the indicative input operation made at the predetermined position on said initial output image and the setting operation performed on the output image, wherein the setting operation includes touching the predetermined position and moving a touching instrument away from the predetermined position while in contact with said initial output image.

4. The method according to claim 1, wherein the output setting performed on said output image includes an N-in-1 setting wherein N is a defined value; and at least one setting is selected from the group comprising of a monochrome/color setting, a darkness setting, an image quality setting, an enlargement/reduction setting, a margin setting, a both-sided print setting, centering, removal of frame, a document orientation setting, stapling, punching, a document size setting, a paper size setting, and sorting wherein the N in 1 is set by one of laterally and vertically sliding a pointing instrument, including a finger, within a vicinity of an imaginary centerline on the output image so as to partitioned the output image into multiple parts.

5. The method according to claim 1, wherein the single predetermined position on said output initial image is at least one position selected from the group comprising of the center, the corners, the periphery, the edge, and the outer periphery of the display area of the output image.

6. The method according to claim 1, wherein the indicative input operation performed on said initial output image includes pointing at the single predetermined position and at least one setting operation performed on said initial output image is selected from the group comprising of continuous pointing at the predetermined position, a horizontal pointing shift, a vertical pointing shift, a rotational pointing shift, and an oblique linear pointing shift extending from the predetermined position and a pointing shift crossing the display area of the output image and wherein the at least one setting operation is executed relative to the single predetermined position.

7. A non-transitory computer readable medium embedded with program code to perform the method of claim 1.

8. The non-transitory computer readable medium according to claim 7, further comprising:
    program code for determining whether the setting operation, perform on said initial output image, is valid;
    program code for determining whether the resulting output setting, set according to a valid setting operation performed on said initial output image is valid; and
    program code for displaying an error message if the resulting output setting, set by the valid setting operation, is not valid.

9. A non-transitory computer readable medium according to claim 7 further comprising:
    program code for determining whether the setting operation performed on said output setting menu is valid;
    program code for displaying the output image immediately before the setting operation is made, if the output image settings are not valid;
    program code for determining whether the output setting, set according to the setting operation, performed on said output setting menu is valid; and
    program code for displaying an error message and the output image immediately before the setting operation is made, if the output setting, set by the setting operation, is not valid.

10. The method according to claim 1, further comprising the steps of:
    determining whether the setting operation made on the initial output image is valid, wherein when it is determined that the setting operation is not valid, displaying the output image immediately before the setting operation is made.

11. The method according to claim 1, further comprising the steps of:
   determining whether an output setting set according to the setting operation on the initial output image is valid, wherein when it is determined that the output setting is not valid, displaying an error message and displaying the initial output image immediately before the setting operation is made.

12. A multifunction peripheral comprising:
a touch screen display;
a setting control for displaying an initial output image;
a setting operation, inputting an output image settings, including continuously pushing a single predetermined position on said initial output image;
a setting control for displaying an output setting menu, wherein the output setting menu relates to a predetermined position on said touch screen display and setting operations include vertical movement of a pointing device on said output setting menu;
a setting control for displaying an image quality icon for indicating image quality related information relating to said setting operations performed on said output setting menu;
a setting operation for performing an indicative input operation at said single predetermined position on said initial output image;
a setting control for switching the touch screen display to a mode for inputting the output image settings on said initial output image; wherein the output image may be reset by a predetermined reversed setting operation performed on the output setting menu operating icon to return the output image to the initial output image, wherein the output image and the initial output image are displayed simultaneously during the reversed setting operation and wherein said predetermined reversed setting operation include drawing a cross within a whole display area of the output image;
a setting control for updating the output image according to the output image settings made directly on said initial output image via the touch screen display; and
a setting control for displaying the updated output image, on said touch screen display, as the final output image when setting operations are stopped wherein the indicative input operation and output image settings are performed directly on the initial output image so displayed and the indicative input operation identifies an initial location on the initial output from which all subsequent output image setting extends.

* * * * *